(12) United States Patent
Kugel et al.

(10) Patent No.: US 6,412,802 B1
(45) Date of Patent: Jul. 2, 2002

(54) RECTILINEAR PROPULSION APPARATUS

(76) Inventors: Marion S. Kugel, deceased, late of Welches, OR (US); Sophia H. Kugel, legal representative, P.O. Box 1146, Welches, OR (US) 97067

( * ) Notice: Subject to any disclaimer, the term of this patent is extended or adjusted under 35 U.S.C. 154(b) by 0 days.

(21) Appl. No.: 09/948,742

(22) Filed: Sep. 7, 2001

(51) Int. Cl.[7] .............................................. B62M 1/04
(52) U.S. Cl. ......................... 280/252; 280/254; 74/30; 74/32; 74/33
(58) Field of Search .............................. 280/252, 253, 280/254, 200, 210, 241, 251, 258; 485/57; 74/25, 29, 30, 32, 33, 575

(56) References Cited

U.S. PATENT DOCUMENTS

| | | | | |
|---|---|---|---|---|
| 250,316 | A | * 11/1881 | Whiting | 280/252 X |
| 649,806 | A | * 5/1900 | Busche | 280/252 X |
| 651,244 | A | * 6/1900 | Forbes | 280/254 X |
| 719,595 | A | * 2/1903 | Huss | 280/252 |
| 1,440,372 | A | * 1/1923 | Brown et al. | 280/254 X |
| 3,661,404 | A | 5/1972 | Bossaer | 280/255 |
| 4,953,882 | A | 9/1990 | Craig, Jr. | 280/258 |
| 5,156,412 | A | * 10/1992 | Meguerditchian | 280/252 X |
| 5,236,211 | A | 8/1993 | Meguerditchian | 280/252 X |
| 5,335,927 | A | 8/1994 | Islas | 280/255 |
| 5,496,051 | A | 3/1996 | Farmos | 280/252 |
| 5,540,111 | A | * 7/1996 | Barnett et al. | 280/252 X |
| 5,716,069 | A | 2/1998 | Bezerra et al. | 280/254 |
| 5,785,337 | A | 7/1998 | Ming | 280/255 |

* cited by examiner

Primary Examiner—Robert P. Olszewski
Assistant Examiner—F. Zeender

(57) ABSTRACT

A rectilinear propulsion apparatus for propelling a bicycle. The rectilinear propulsion apparatus includes a rectilinear drive portion comprising a plurality of rack gear assemblies fixedly coupled to the sides of the middle frame portion of the bicycle, each of which have a pedal for biasing the rack gear assemblies by the rider. A quadrant drive portion comprising a plurality of quadrant sprocket members fixedly coupled to a main drive gear member which drives a drive wheel of the bicycle. The sprocket members are designed for alternately engaging the rack gear assemblies thereby propelling the bicycle. A clutch member coupled to the main drive gear member permits one of the rack gear assemblies to ratchet upwardly while the opposing gear assembly is being manually biased downwardly by the rider thereby allowing the rider to reciprocately propel the bicycle.

11 Claims, 3 Drawing Sheets

RECTILINEAR PROPULSION APPARATUS

BACKGROUND OF THE INVENTION

1. Field of the Invention

The present invention relates to propulsion systems and more particularly pertains to a new rectilinear propulsion apparatus for propelling a bicycle.

2. Description of the Prior Art

The use of propulsion systems is known in the prior art. More specifically, propulsion systems heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. No. 5,236,211; U.S. Pat. No. 4,953,882; U.S. Pat. No. 5,785,337; U.S. Pat. No. 5,496,051; U.S. Pat. No. 5,335,927; U.S. Pat. No. 5,716,069; and U.S. Pat. No. 3,661,404.

While these devices fulfill their respective, particular objectives and requirements, the aforementioned patents do not disclose a new rectilinear propulsion apparatus. The inventive device includes a rectilinear drive portion comprising a plurality of rack gear assemblies fixedly coupled to the sides of the middle frame portion of the bicycle, each of which have a pedal for biasing the rack gear assemblies by the rider. A quadrant drive portion comprising a plurality of quadrant sprocket members fixedly coupled to a main drive. gear member which drives a drive wheel of the bicycle. The sprocket members are designed for alternately engaging the rack gear assemblies thereby propelling the bicycle. A clutch member coupled to the main drive gear member permits one of the rack gear assemblies to ratchet upwardly while the opposing gear assembly is being manually biased downwardly by the rider thereby allowing the rider to reciprocately propel the bicycle.

In these respects, the rectilinear propulsion apparatus according to the present invention substantially departs from the conventional concepts and designs of the prior art, and in so doing provides an apparatus primarily developed for the purpose of propelling a bicycle.

SUMMARY OF THE INVENTION

In view of the foregoing disadvantages inherent in the known types of propulsion systems now present in the prior art, the present invention provides a new rectilinear propulsion apparatus construction wherein the same can be utilized for propelling a bicycle.

The general purpose of the present invention, which will be described subsequently in greater detail, is to provide a new rectilinear propulsion apparatus and method which has many of the advantages of the propulsion systems mentioned heretofore and many novel features that result in a new rectilinear propulsion apparatus which is not anticipated, rendered obvious, suggested, or even implied by any of the prior art propulsion systems, either alone or in any combination thereof.

To attain this, the present invention generally comprises a rectilinear drive portion comprising a plurality of rack gear assemblies fixedly coupled to the sides of the middle frame portion of the bicycle, each of which have a pedal for biasing the rack gear assemblies by the rider. A quadrant drive portion comprising a plurality of quadrant sprocket members fixedly coupled to a main drive gear member which drives a drive wheel of the bicycle. The sprocket members are designed for alternately engaging the rack gear assemblies thereby propelling the bicycle. A clutch member coupled to the main drive gear member permits one of the rack gear assemblies to ratchet upwardly while the opposing gear assembly is being manually biased downwardly by the rider thereby allowing the rider to reciprocately propel the bicycle.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new rectilinear propulsion apparatus and method which has many of the advantages of the propulsion systems mentioned heretofore and many novel features that result in a new rectilinear propulsion apparatus which is not anticipated, rendered obvious, suggested, or even implied by any of the prior art propulsion systems, either alone or in any combination thereof.

It is another object of the present invention to provide a new rectilinear propulsion apparatus which may be easily and efficiently manufactured and marketed.

It is a further object of the present invention to provide a new rectilinear propulsion apparatus which is of a durable and reliable construction.

An even further object of the present invention is to provide a new rectilinear propulsion apparatus which is susceptible of a low cost of manufacture with regard to both materials and labor, and which accordingly is then susceptible of low prices of sale to the consuming public, thereby making such rectilinear propulsion apparatus economically available to the buying public.

Still yet another object of the present invention is to provide a new rectilinear propulsion apparatus which provides in the apparatuses and methods of the prior art some of the advantages thereof, while simultaneously overcoming some of the disadvantages normally associated therewith.

Still another object of the present invention is to provide a new rectilinear propulsion apparatus for propelling a bicycle.

Yet another object of the present invention is to provide a new rectilinear propulsion apparatus which includes a rectilinear drive portion comprising a plurality of rack gear assemblies fixedly coupled to the sides of the middle frame portion of the bicycle, each of which have a pedal for biasing the rack gear assemblies by the rider. A quadrant drive portion comprising a plurality of quadrant sprocket members fixedly coupled to a main drive gear member which drives a drive wheel of the bicycle. The sprocket members are designed for alternately engaging the rack gear assemblies thereby propelling the bicycle. A clutch member coupled to the main drive gear member permits one of the rack gear assemblies to ratchet upwardly while the opposing gear assembly is being manually biased downwardly by the rider thereby allowing the rider to reciprocately propel the bicycle.

Still yet another object of the present invention is to provide a new rectilinear propulsion apparatus that permits the rider to propel the bicycle more efficiently by utilizing the maximum amount of power available by using only rectilinear motion of the pedals to propel the bicycle, thereby eliminating the inefficient portions of a traditional circular drive motion of a bicycle.

Even still another object of the present invention is to provide a new rectilinear propulsion apparatus that utilizes an efficient quadrant gear and rack gear mechanism in conjunction with a clutch mechanism.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
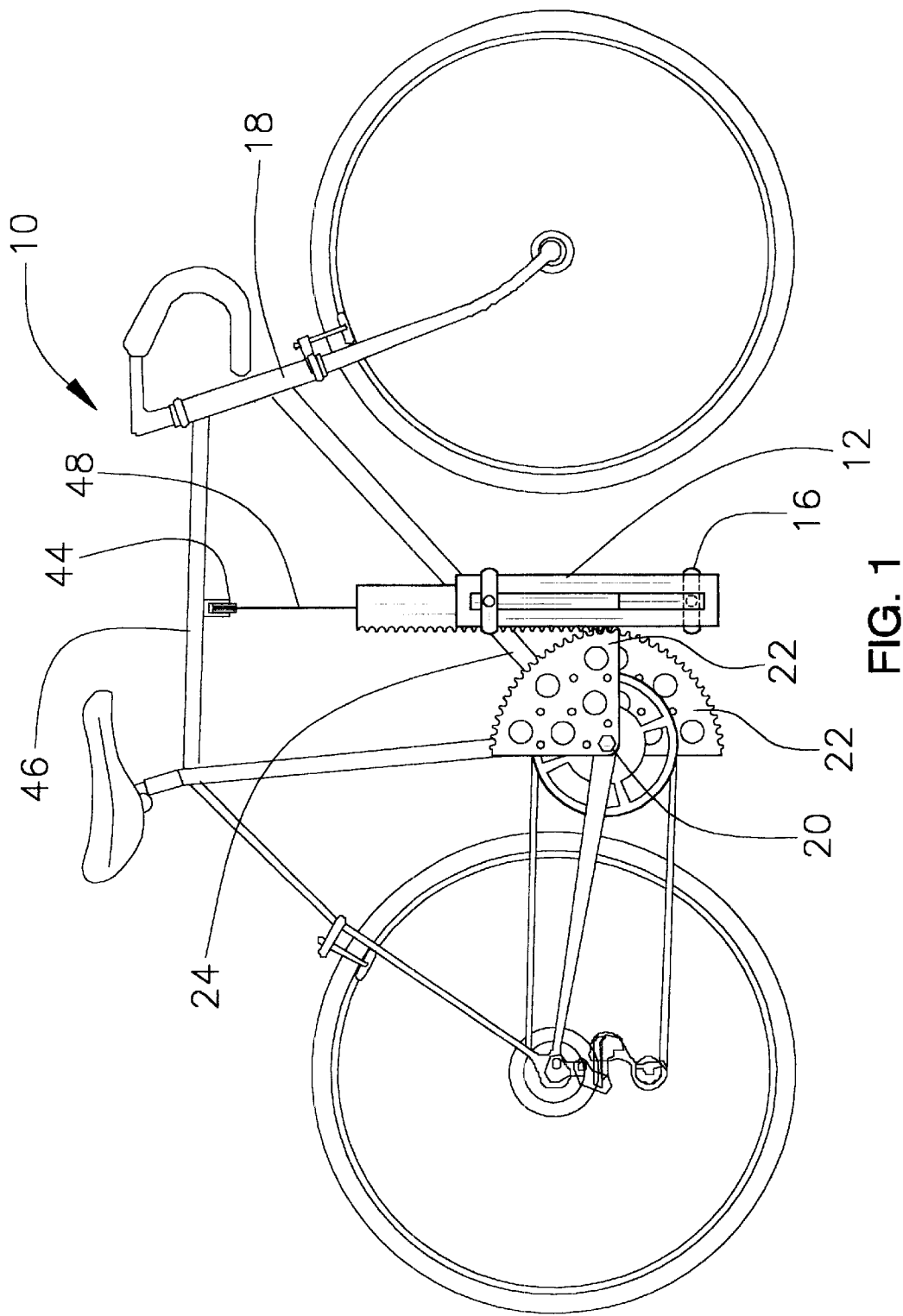
FIG. 1 is a side view of a new rectilinear propulsion apparatus according to the present invention.
Figure 2:
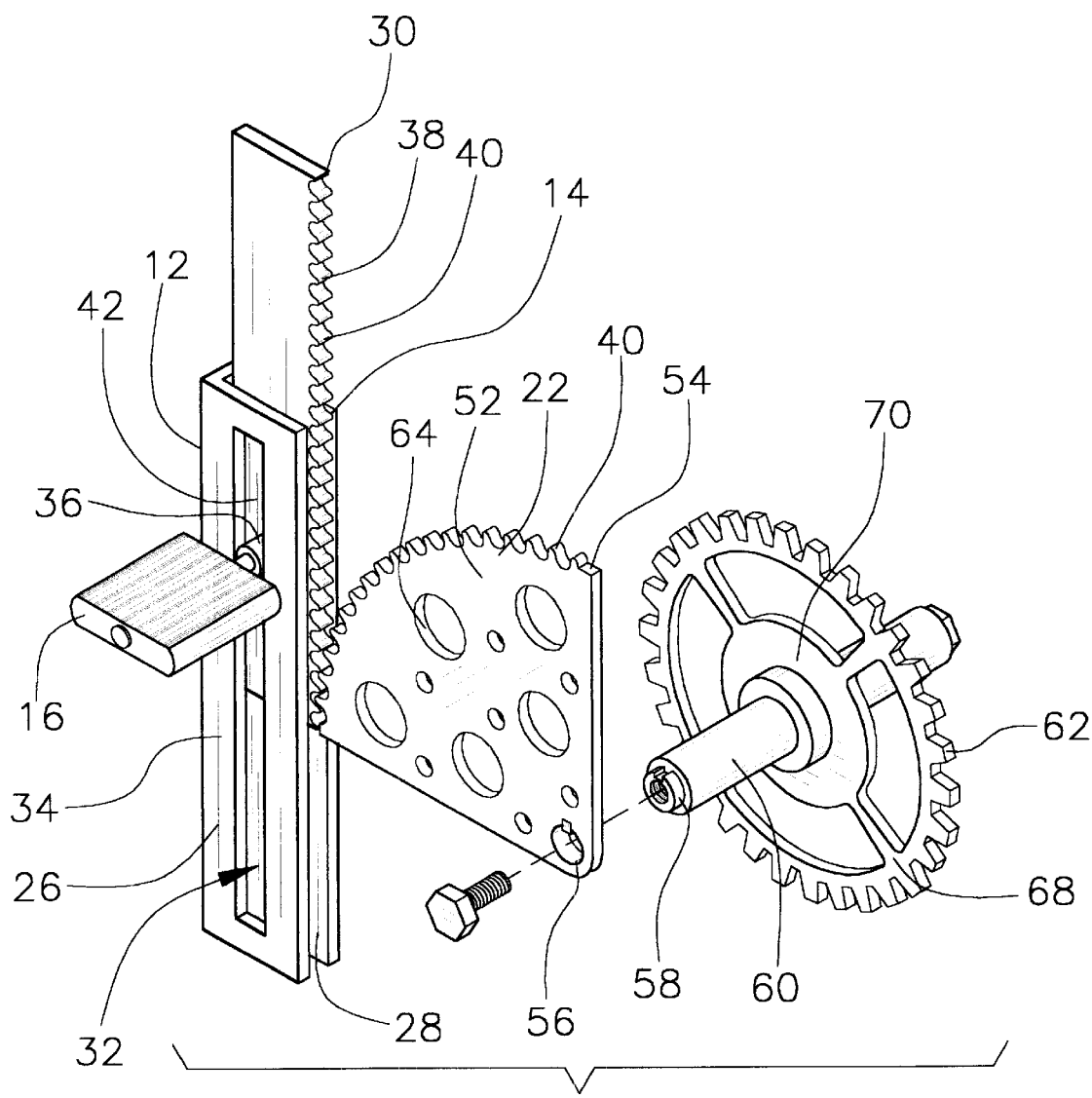
FIG. 2 is an exploded view of one side of the gearing mechanisms of the present invention.
Figure 3:
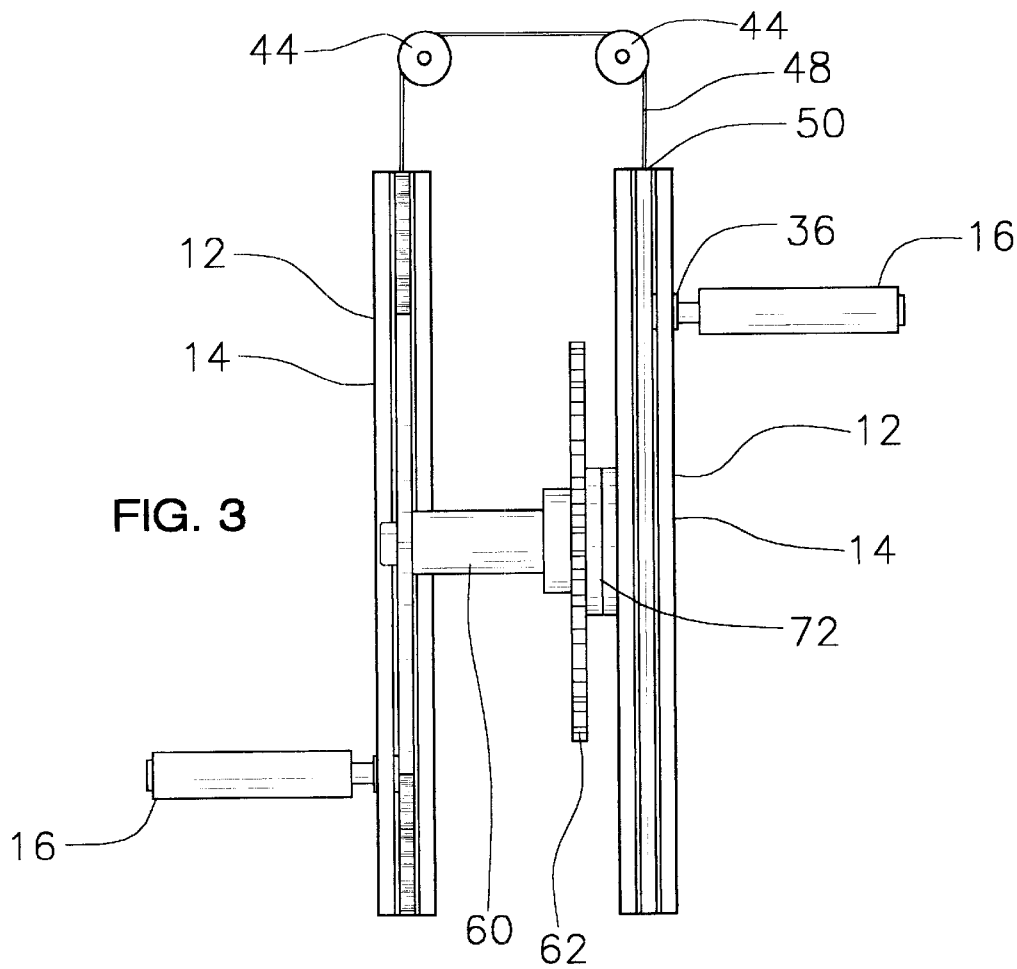
FIG. 3 is a front view of the gearing mechanisms of the present invention.
Figure 4:
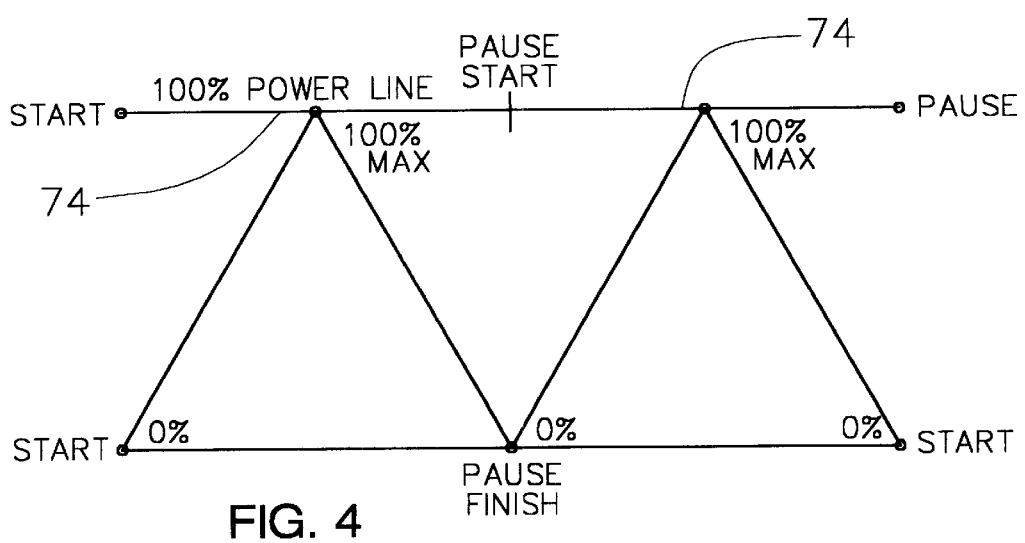
FIG. 4 is a schematic of the power curve of the present invention with respect to that of a traditional bicycle.

With reference now to the drawings, and in particular to FIGS. 1 through 4 thereof, a new rectilinear propulsion apparatus embodying the principles and concepts of the present invention and generally designated by the reference numeral 10 will be described.

As best illustrated in FIGS. 1 through 4, the rectilinear propulsion apparatus 10 generally comprises a rectilinear drive portion 12. The rectilinear drive portion 12 includes a plurality of rack gear assemblies 14. The rack gear assemblies 14 have a pedal member 16. The pedal member 16 is designed for being depressed by a rider to propel the bicycle 18.

A quadrant drive portion 20 includes a plurality of quadrant sprocket members 22. The quadrant sprocket members 22 are designed for engaging the rack gear assemblies 14.

Both the rectilinear drive portion 12 and the quadrant drive portion 20 are fixedly coupled to a middle frame portion 24 of the bicycle 18 such that the portions are designed for propelling a bicycle 18.

The plurality of rack gear assemblies 14 of the rectilinear drive portion 12 is fixedly coupled to sides of the middle frame portion 24 of the bicycle 18. A longitudinal axis of the rack gear assemblies 14 is oriented in the same vertical plane as the bicycle 18. The plurality of rack gear assemblies 14 of the rectilinear drive portion 12 has a rack housing member 26. Each of the rack housing members 26 has a channel portion 28. The channel portion 28 is designed for receiving a rack drive member 30 such that the rack drive member 30 is slidable in the channel portion 28 of the rack housing member 26.

The rack housing members 26 have a slot 32. The slot 32 is located in a slot side 34 of the rack housing member 26. The slot side 34 is designed for receiving a bearing member 36 of the pedal members 16 for the purpose of allowing the pedal members 16 to reciprocate in the slot side 34 of the rack housing member 26 when the rack drive member 30 reciprocates within the rack housing member 26.

The rack drive member 30 has a tooth side 38. The tooth side 38 comprises a plurality of gear teeth 40 for the purpose of engaging the quadrant sprocket members 22 of the quadrant drive portion 20.

The bearing member 36 of the pedal members 16 is mounted on a side surface 42 of the rack drive member 30 through the slot 32 of the slot side 34 of the rack housing member 26 thereby allowing the pedal members 16 to rotate freely as required when engaged by the rider.

The rectilinear drive portion 12 includes a plurality of pulley members 44. The pulley members 44 are pivotally coupled to an upper frame portion 46 of the bicycle 18. A cord member 48 is fixedly coupled to top portions 50 of the rack drive members 30 such that the pulley members 44 are designed for guiding the cord member 48 in such a way that when one of the rack drive members 30 is manually biased downwardly, the opposing rack drive member 30 is biased by the cord member 48 through the pulley members 44 upwardly.

The quadrant sprocket members 22 of the quadrant drive portion 20 comprise a quarter circle plate 52 having gear teeth 40 along a quarter circle edge 54. The quarter circle edge 54 is designed for engaging the rack gear assemblies 14 of the rectilinear drive portion 12.

The quadrant sprocket members 22 of the quadrant drive portion 20 have a drive hole 56. The drive hole 56 is designed for receiving an end portion 58 of a drive shaft 60 of a main drive gear member 62.

The quadrant sprocket members 22 have a plurality of bores 64. The bores 64 are designed for reducing the weight of the quadrant sprocket members 22.

The main drive gear member 62 comprises the drive shaft 60 and a circular gear plate member 68. The drive shaft 60 is fixedly coupled to the circular gear plate member 68 such that the drive shaft 60 extends transversely from outer surfaces 70 of the circular gear plate member 68 such that the main drive gear member 62 is designed for directly translating energy produced by the quadrant sprocket members 22 to a drive wheel of the bicycle 18.

A clutch member 72 is fixedly coupled to the drive shaft 60. The clutch member 72 is designed for allowing ratcheting of one of the rack gear assemblies 14 during a drive portion 74 of the opposing rack gear assemblies 14 thereby permitting a rider to depress one of the pedal members 16 while the opposing pedal member 16 moves upwardly into a readily depressible position.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A rectilinear propulsion apparatus in combination with a bicycle for propelling the bicycle, wherein the bicycle includes a drive wheel and a frame having a middle frame portion, the rectilinear propulsion apparatus comprising:

a rectilinear drive portion, said rectilinear drive portion including a plurality of rack gear assemblies, each of said rack gear assemblies having a pedal member, each of said pedal members being adapted for being depressed by a rider to propel the bicycle;

each of said rack gear assemblies of said rectilinear drive portion having a rack housing member, each of said rack housing members having a channel portion, said channel portion being adapted for receiving a rack drive member such that each of said rack drive members is movable in said channel portion of an associated one of said rack housing members;

a plurality of pulley members being pivotally coupled to the upper frame portion of the bicycle, a cord member being fixedly coupled to top portions of said rack drive members such that each of said pulley members are for guiding said cord member in such a manner that when one of said rack drive members is manually biased downwardly, an opposing rack drive member is biased by said cord member through said pulley members upward;

a quadrant drive portion, said quadrant drive portion including a plurality of quadrant sprocket members, each of said quadrant sprocket members being adapted for engaging an associated one of said rack gear assemblies; and wherein both said rectilinear drive portion and said quadrant drive portion are fixedly coupled to the middle frame portion of the bicycle such that said portions being adapted for propelling a bicycle.

2. The rectilinear propulsion apparatus as set forth in claim 1, further comprising:

said plurality of rack gear assemblies of said rectilinear drive portion being fixedly coupled to sides of the middle frame portion of the bicycle, a longitudinal axis of said rack gear assemblies being oriented in the same vertical plane as the bicycle; and said rack housing members having a slot, said slot being located in a slot side of said rack housing member, said slot side being adapted for receiving a bearing member of said pedal members for the purpose of allowing said pedal members to reciprocate in said slot side of said rack housing members.

3. The rectilinear propulsion apparatus as set forth in claim 2, further comprising:

said rack drive member having a tooth side, said tooth side comprising a plurality of gear teeth for the purpose of engaging said quadrant sprocket members of said quadrant drive portion.

4. The rectilinear propulsion apparatus as set forth in claim 2, further comprising:

said bearing member of said pedal members being pivotally coupled to a side surface of said rack drive member through said slot of said slot side of said rack housing member thereby allowing said pedal members to rotate freely as required when engaged by the rider.

5. The rectilinear propulsion apparatus as set forth in claim 2, further comprising:

said rectilinear drive portion including a plurality of pedal members, each of said pedal members being rotatably coupled to said rack drive members.

6. The rectilinear propulsion apparatus as set forth in claim 1, further comprising:

said quadrant sprocket members of said quadrant drive portion comprising a quarter circle plate having gear teeth along a quarter circle edge, said quarter circle edge being adapted for engaging said rack gear assemblies of said rectilinear drive portion.

7. The rectilinear propulsion apparatus as set forth in claim 6, further comprising:

said quadrant sprocket members of said quadrant drive portion having a drive hole, said drive hole being adapted for receiving an end portion of a drive shaft of a main drive gear member.

8. The rectilinear propulsion apparatus as set forth in claim 7, further comprising:

said quadrant sprocket members having a plurality of bores, said bores being adapted for reducing the weight of said quadrant sprocket members.

9. The rectilinear propulsion apparatus as set forth in claim 7, further comprising:

said main drive gear member comprising said drive shaft and a circular gear plate member, said drive shaft being fixedly coupled to said circular gear plate member such that said drive shaft extends transversely from outer surfaces of said circular gear plate member such that said main drive gear member being adapted for directly translating energy produced by said quadrant sprocket members to a drive wheel of the bicycle.

10. The rectilinear propulsion apparatus as set forth in claim 9, further comprising:

a clutch member being fixedly coupled to said drive shaft, said clutch member being adapted for allowing ratcheting of one of said rack gear assemblies during a drive portion of an opposing rack gear assembly thereby permitting a rider to depress one of said pedal members while an opposing of said pedal members moves upwardly into a readily depressible position.

11. A rectilinear propulsion apparatus in combination with a bicycle for propelling the bicycle, wherein the bicycle includes a drive wheel and a frame having a middle frame portion, the rectilinear propulsion apparatus comprising:

a rectilinear drive portion, said rectilinear drive portion including a plurality of rack gear assemblies, each of said rack gear assemblies having a pedal member, each of said pedal members being adapted for being depressed by a rider to propel the bicycle;

each of said rack gear assemblies of said rectilinear drive portion having a rack housing member, each of said rack housing members having a channel portion, said channel portion being adapted for receiving a rack drive member such that each of said rack drive members is movable in said channel portion of an associated one of said rack housing members;

a plurality of pulley members being pivotally coupled to the upper frame portion of the bicycle, a cord member being fixedly coupled to top portions of said rack drive members such that each of said pulley members are for guiding said cord member in such a manner that when one of said rack drive members is manually biased downwardly, an opposing rack drive member is biased by said cord member through said pulley members upward;

a quadrant drive portion, said quadrant drive portion including a plurality of quadrant sprocket members, each of said quadrant sprocket members being adapted for engaging an associated one of said rack gear assemblies;

wherein both said rectilinear drive portion and said quadrant drive portion are fixedly coupled to the middle frame portion of the bicycle such that said portions being adapted for propelling a bicycle;

said plurality of rack gear assemblies of said rectilinear drive portion being fixedly coupled to sides of the middle frame portion of the bicycle, a longitudinal axis of said rack gear assemblies being oriented in the same vertical plane as the bicycle;

said rack housing members having a slot, said slot being located in a slot side of said rack housing member, said slot side being adapted for receiving a bearing member of said pedal members for the purpose of allowing said pedal members to reciprocate in said slot side of said rack housing members;

said rack drive member having a tooth side, said tooth side comprising a plurality of gear teeth for the purpose of engaging said quadrant sprocket members of said quadrant drive portion;

said bearing member of said pedal members being pivotally coupled to a side surface of said rack drive member through said slot of said slot side of said rack housing member thereby allowing said pedal members to rotate freely as required when engaged by the rider;

said rectilinear drive portion including a plurality of pedal members, each of said pedal members being rotatably coupled to said rack drive members;

said quadrant sprocket members of said quadrant drive portion comprising a quarter circle plate having gear teeth along a quarter circle edge, said quarter circle edge being -adapted for engaging said rack gear assemblies of said rectilinear drive portion;

said quadrant sprocket members of said quadrant drive portion having a drive hole, said drive hole being adapted for receiving an end portion of a drive shaft of a main drive gear member;

said quadrant sprocket members having a plurality of bores, said bores being adapted for reducing the weight of said quadrant sprocket members;

said main drive gear member comprising said drive shaft and a circular gear plate member, said drive shaft being fixedly coupled to said circular gear plate member such that said drive shaft extends transversely from outer surfaces of said circular gear plate member such that said main drive gear member being adapted for directly translating energy produced by said quadrant sprocket members to a drive wheel of the bicycle;

a clutch member being fixedly coupled to said drive shaft, said clutch member being adapted for allowing ratcheting of one of said rack gear assemblies during a drive portion of an opposing rack gear assembly thereby permitting a rider to depress one of said pedal members while an opposing of said pedal members moves upwardly into a readily depressible position.

* * * * *